United States Patent [19]

Kawahara et al.

[11] 3,972,762

[45] Aug. 3, 1976

[54] COATING METHOD

[75] Inventors: Sei Kawahara; Akira Takagi; Hirosi Nozawa, all of Fujimiya, Japan

[73] Assignee: Fuji Photo Film Co., Ltd., Minami-ashigara, Japan

[22] Filed: Sept. 3, 1974

[21] Appl. No.: 502,337

[30] Foreign Application Priority Data

Sept. 3, 1973 Japan ................................ 48-99069

[52] U.S. Cl. ................................ 156/196; 156/280; 156/304; 427/326; 427/327; 428/60

[51] Int. Cl.² ........................................ B29C 19/00

[58] Field of Search ........... 156/157, 159, 196, 258, 156/280, 304, 535; 427/322, 326, 327, 299, 444; 428/57, 58, 60

[56] References Cited

UNITED STATES PATENTS 3,531,362 9/1970 Bourns et al........................ 156/304

3,691,003 9/1972 Elischer ............................ 156/304

*Primary Examiner*—Douglas J. Drummond
*Assistant Examiner*—Brian J. Leitten
*Attorney, Agent, or Firm*—Sughrue, Rothwell, Mion, Zinn & Macpeak

[57] ABSTRACT

A method for applying various coating liquids on the surface of a travelling web, such as plastic films, paper, metallic sheets, etc., with a discontinuity thereon, e.g., due to a connection of pieces of the web comprising preworking a web portion so that the web surface downstream of the discontinuity is coplanar to or higher than the maximum height of the discontinuity, whereby irregularities in coating of liquids are eliminated.

8 Claims, 9 Drawing Figures

COATING METHOD

BACKGROUND OF THE INVENTION

1. Field of the Invention

This invention relates to a method for applying various coating liquids to the surface of a long travelling support (hereinafter, for simplicity designated a "web"). More particularly, the invention relates to a method for applying various coating liquids to the web while preventing a thick coating of the coating liquid which often is formed in a connection between webs.

2. Description of the Prior Art

A conventional process, wherein various coating liquids are applied to a web such as plastic films, paper, metallic sheets, etc., and then dried to obtain desired products, has been widely used in manufacturing photographic films, printing papers, magnetic tapes, adhesive tapes, no-carbon papers, PS formats, etc.

In the process of manufacture as described above, it is advantageous for the coating to be applied in a substantially continuous manner, and in general the coating operation is usually carried out in such a way that a web formed by connecting pieces of webs or web portions having a limited length one after another is fed to a coating station so that the coating operation occurs without interruption. In connecting web portions, the so-called "butt joint" is preferably employed, in which ends of both of the web portions are abutted and connected using, e.g., an adhesive tape as a splicing tape; and it is known to be more advantageous to apply the splicing tape to the surface on which the coating liquid is to be applied than on the opposite surface of the web, and it is known to pre-apply a surface treatment to the splicing tape so that the surface characteristic of the splicing tape will be substantially the same as that of the surface of web to which the coating liquid is applied.

However, if a fluid coating liquid is applied to the web splice thus formed in a continuous manner, several significant disadvantages, which have been heretofore encountered, are produced principally following, i.e., downstream of, the splice.

One disadvantage is such that bubbles are formed due to the presence of air between the web surface directly following the splice and the coated layer, and these bubbles adhere to coating nozzles so that the coated surface over a considerable length is adversely affected by streaks or the like. Another disadvantage is that uncoated or extremely thinly coated portions and thereafter locally thickly coated portions are formed in the coating applied to the surface of the web directly following the splicing tape due to the step-like discontinuous changes at the trailing edge of the splicing tape in the splice and the presence of air as described above. A considerable amount of time is required to dry the thickly coated portions in a subsequent drying process as compared with the other portions properly coated. If the drying process does not have sufficient capacity to dry the thickly coated portion, the result is that the thickly coated portion remains undried, the undried coated liquid is transferred onto rollers or the like to contaminate the equipment and thereby damage the coating properly applied, leading to fatal defects in the product produced. For this reason, where the equipment is contaminated, the manufacturing operation must be stopped for cleaning, which results in a marked reduction in production efficiency. Conversely, where the undried portion is to be prevented from occurring, sufficient drying capacity for the locally thickly coated portion must be provided in the drying process. This thickly coated portion, however, is not useful as a product but is discarded, and therefore it is extremely uneconomical to spend money for drying those portions ultimately to be discarded.

While the splicing of web portions has been described above, similar coating failures such as coating irregularities also occur if the surface of the web to which a liquid is to be applied has other types of discontinuities such as projections, steps, or the like.

Several proposals have been made to prevent the aforementioned coating failures caused by discontinuities formed by the splicing tape or the like.

One such device is disclosed in U.S. Pat. No. 3,531,362. Briefly, this method comprises (1) applying an oily hydrophobic material to the discontinuities, the surface of the web adjacent thereto, and the following portion of the discontinuities, or (2) providing an inclination to the discontinuities so as to eliminate the wedge-like space formed in the trailing edge of the discontinuities prior to applying the coating liquid to the web.

However, in the above-described method (1), generally, if the coating liquid is aqueous in nature, the oily hydrophobic material tends to produce a poor adhesion relative to the coating and the coating after drying tends to peel off by application of a small external force. Furthermore, this method requires an operation wherein a surface treatment is applied using an oily hydrophobic treating liquid to the discontinuities. However, this operation tends to result in equipment contamination by the treating liquid and a contamination of other portions of the web. Moreover, a dryer must be provided if it is desired to sufficiently dry those portions to which the treating liquid has once been applied.

In addition, the above-described method (2) is not practical in terms of the actual shape and thickness of the splicing adhesive tape. That is, splicing tapes generally used for this purpose are made by applying an adhesive to elements having a thickness of about 10 to 50 microns, with most tapes having a total thickness formed by the element plus the adhesive of about 30 to 100 microns. In order to effectively use this method, the adhesive portion should also be inclined as well. However, it is very difficult to incline the trailing edge of such a thin tape either in pre-treatment or in treatment after the tape has been applied.

Also, the method wherein an inclination is formed by inserting a packing such as rubber cement between the trailing edge and the web surface after the tape has been applied is complicated and at the same time other portions of web and the equipment tend to be contaminated similarly to the afore-mentioned treatment using the oily hydrophobic material.

Another method is disclosed in British Pat. No. 1,243,663. This method comprises pre-spraying and adhering water to at least the trailing edge of a splicing tape, and applying the coating liquid before the water has completely dried.

However, this method possesses several disadvantages in that (a) a complicated device is required to detect the splicing tape immediately before a coating station to apply water to the trailing edge of the splicing tape; (b) after water is applied to the web, the web can not be supported, for example, by rollers, etc., so that the layout of the web passage in the vicinity of the coating station is limited; and (c) where the web absorbs water with difficulty, water drops on the web adhere to coating devices such as coating nozzles, thus adversely affecting the coating operation thereafter.

SUMMARY OF THE INVENTION

An object of the present invention is to provide a method which avoids and overcomes coating failures such as coating irregularities produced in the areas following a discontinuity when a layer of a coating liquid is applied to the surface of a web having discontinuities, such as a tape splice or the like.

A further object of the present invention is to provide a method which can completely eliminate risks of equipment contamination or contamination of other portions of the web in avoiding and overcoming the above-described coating difficulties.

Another object of the present invention is to provide a method which is convenient and effective, without using treating liquids whose handling is limited, in avoiding and overcoming the above-described coating difficulties.

Still another object of the present invention is to enable a reduction in drying capacity to thus provide an economical drying process through the avoidance of the above-described difficulties and the elimination of locally thick coating.

The present invention provides a method for applying a coating liquid to a travelling web having discontinuities formed on the surface to be coated due to web splices or the like, comprising treating the support prior to coating a liquid in such a way that the level of the surface to be coated following the discontinuity is made coplanar to or higher than the highest portion of the discontinuity thereby overcoming coating difficulties such as coating irregularities.

The description "discontinuous area" or "discontinuity" is used herein to designate relatively abrupt changes in the surface levels of adjacent surface areas, e.g., drops or steplike changes in the surface level. In addition, the terms "leading", "preceding", "succeeding", "trailing" and "following" have been used to designate physical position or location and are used in reference to the direction of travel of the web.

DESCRIPTION OF THE PREFERRED EMBODIMENTS

For a more complete understanding of the present invention, reference may be made to the following detailed description which may be read in connection with the accompanying drawings.

Figure 1:
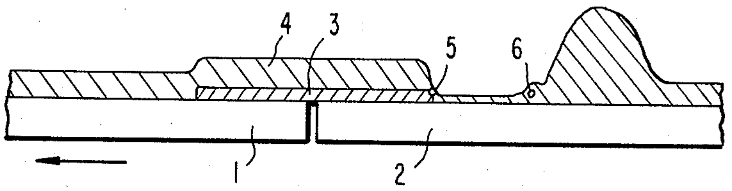
FIG. 1 is a schematic illustration of a splice in section showing the mode of layer formation in which a liquid is coated without applying any treatment to a web spliced by a butt joint.

FIG. 1 schematically illustrates the mode of a layer formation where untreated spliced portions are coated with a liquid. The trailing end of a preceding web portion 1 and the leading end of a succeeding web portion 2 are joined by a so-called "butt joint" using a splicing tape 3 adhered along a seam between both web portions. The web travels in the direction as indicated by the arrow toward a coating station. A space formed 4 of a coating liquid is a substantially liquid material, this material being uniformly coated on the surface of the web and thereafter solidified and dried. However, uniform coating may not be attained in the vicinity of the splice due to the presence of a discontinuity in the surface of the web caused by the splicing tape. That is, as shown in FIG. 1, an extremely thinly coated or uncoated portion directly following the splicing tape and thereafter a locally thickly coated portion are produced. Air accompanied by the trailing edge of the splicing tape is trapped in a spaceformed by the trailing edge of the splicing tape 3, the surface of the succeeding web portion 2, and the layer 4 of the coating liquid is to produce a bubble 5 or to produce a bubble 6 while being entrained into the layer 4 of the coating liquid. Further, these bubbles 5 and 6 are often trapped by a coating nozzle to produce a coating failure, the so-called "streaks", thus adversely affecting the surface of the layer.

It is believed that such phenomenon as described above is produced due to the presence of a step-like discontinuity on the surface of web to be coated. As the trailing edge of the splicing tape 3 passes through the coating station, air is trapped in a space formed by the trailing edge of the splicing tape 3, the surface of web portion 2 and the layer of coating liquid, and the layer of the coating liquid in that portion covers a thin layer of air. As the coating proceeds further, the air thus trapped and the layer of the coating liquid covering the air slip on the surface of the succeeding web portion 2 and move backward in the direction of travel of the web. At this time, it is believed that the air trapped in this space is pulled into the layer of the coating liquid to form air bubbles 5 and 6, while the layer of the coating liquid which has moved backward forms a thickly coated portion.

The above-described locally thickly coated portion produced by the phenomenon as described above remains undried in the drying process even after other properly coated portions have been dried, and a dryer having a larger capacity than needed must be provided to dry such an undried portion. However, this thickly coated portion is not useful as a product but is discarded, thus a great amount of waste is produced due to the above-described coating failures.

In the following embodiments, the layer of coating liquid is not shown unless otherwise specified for the purpose of simplicity.

Figure 2:
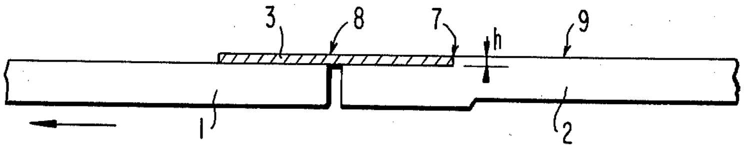
FIGS. 2, 3, 4, 5, 6, 7 and 9 are schematic illustrations in section showing a preferred embodiment of the present invention.

FIG. 2 illustrates a preferred form of the present invention.

Quite similar to the case shown in FIG. 1, the trailing end of the preceding web portion 1 and the leading end of the succeeding web portion 2 are spliced by means of the splicing tape 3. However, in this specific embodiment, the succeeding web portion 2 is worked stepwise or reduced in thickness directly behind the splicing tape 3 to form a step 7. This step 7 has height $h$ which is substantially equal to the thickness of the splicing tape 3. From this arrangement, the surface 8 of the splicing tape 3 and the surface 9 of the succeeding web 2 are substantially coplanar, thus eliminating a discontinuity in levels therebetween. When the spliced web thus treated travels in the direction indicated by the arrow into the coating station, it has been found that no coating failure occurs directly following the splicing tape 3, in contrast to that shown in FIG. 1.

From the assumption that the above-described coating failure is attributed to the air accompanying the trailing edge of the tape and that the air is due to the presence of the step between the surface of the splicing tape 3 and the surface of the succeeding web portion 2, it can be naturally considered that the above-described coating failure can be eliminated by removing the step so that the surface of the splicing tape 3 is coplanar with the surface of the succeeding web portion 2.

In the actual process, such a succeeding web portion 2 downstream of the splicing tape 3 can be worked or thickness reduced in a relatively simple manner, for example, by the incorporation of a pressing means of simple construction into a web splicing device, or by the provision of a pair of press rollers whose surfaces are formed with the step in the process prior to the coating station whereby the web can be suitably pressed.

Figure 3:
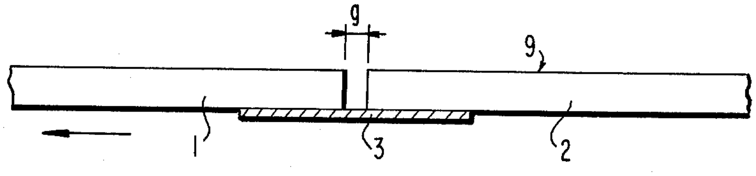

FIG. 3 illustrates another embodiment of the present invention.

In this embodiment, the preceding web portion 1 and the succeeding web portion 2 are butt connected by applying a splicing tape 3 to the surface of the web opposite the surface to be coated. Specifically, a gap *g* is formed between the web portion ends. If the web having the splice as hereinbefore described is moved in the direction as indicated by the arrow, it has been found no coating failure downstream of the discontinuity occurs despite the presence of the gap *g* in the surface to be coated and the presence of the discontinuity.

From the assumption as previously described that the air trapped within the space formed by the trailing edge of the splicing tape 3, the surface of the succeeding web portion 2, and the layer 4 of coating liquid slips on the surface of the succeeding web portion 2 and a thickly coated portion is formed at a portion where this slip stops, it may be considered that the air accompanying the trailing edge of the preceding web portion 1 is trapped in this gap *g* leaving no room for slipping, and thus no coating failures such as coating irregularities are produced.

Figure 4:
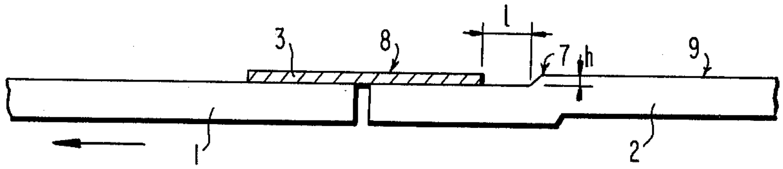

FIG. 4 illustrates still another embodiment of the present invention. In FIG. 4, the preceding web portion 1 and the succeeding web portion 2 are butt connected using a splicing tape 3, the succeeding web portion 2 being formed with a step 7 at a point downstream at a distance of *l* from the trailing edge of the splicing tape 3. Here, the height *h* of the step 7 is substantially the same as the thickness of the splicing tape 3. If a web having the connection as hereinbefore described is driven in the direction as indicated by the arrow, it has been found no coating failure attributed to the discontinuity of the surface of the web occurs. If may also be considered that the accompanying air is trapped in a space between the trailing edge of the splicing tape 3 and the step 7 similar to the case shown in FIG. 3.

Suitable values of the gap *g* and the distance *l* from the trailing edge of the splicing tape to the step cannot be set forth unequivocally since they differ depending upon the kind of coating liquid, the surface characteristics of the web, the thickness of the splicing tape, the height of the step, the speed of coating, the quantity of the coating and the like.

Preferably, these values are determined experimentally under the actual use conditions required. In general, for both gap *g* and distance *l*, a smaller value is preferred, and excellent results can be obtained with a value ranging from approximately 0 to 15 mm.

Figure 5:
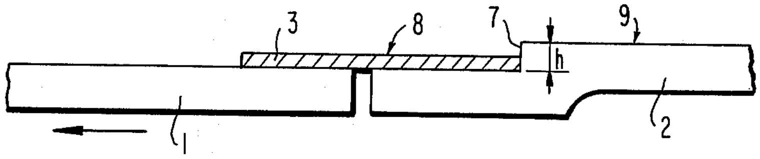

FIG. 5 illustrates another embodiment of the present invention. In FIG. 5, the height *h* of the step 7 shown in FIG. 2 is made greater than the thickness of the splicing tape 3 by the thickness of the layer 4 of the coating liquid. If a web having the connection as hereinbefore described is driven in the direction as indicated by the arrow, into the coating station, it has been found no coating failures attributed to the discontinuity of the web surface occur.

The reason for this is not apparent, but on considering the fact that no coating failure is produced in the surface of the splicing tape 3 even when the coating is carried out with the spliced web receiving no treatment as shown in FIG. 1, coating failure would not also be produced in the case shown in FIG. 5.

Figure 6:
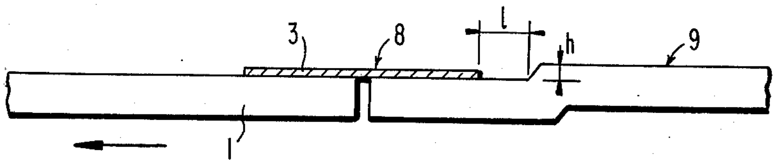

FIG. 6 illustrates still another embodiment of the present invention. The arrangement in FIG. 6 is a further improvement in the arrangement in FIG. 4, wherein the step 7 is formed so that the height *h* is greater than the thickness of the splicing tape 3 by the thickness of the layer of coating liquid 4. If a web having the splice as hereinbefore described is driven in the direction as shown by the arrow into the coating station, it has been found no coating failure attributed to the discontinuity of the web surface occurs. Also in this case similar to that shown in FIG. 4, the distance *l* from the trailing edge of the splicing tape 3 to the step 7 desirably has a smaller value, and excellent results has been obtained with a distance ranging from approximately 0 to 15 mm.

From the foregoing embodiments, it will be appreciated that the position and height of the step 7 provided in the succeeding web portion 2 downstream of the splicing tape 3 can be varied over a considerably wide range. From this reason, extreme dimensional accuracy is not required when the step is formed in the succeeding web portion 2 using a tool, whereby the arrangement of the invention is advantageous in terms of the equipment required and easy to accomplish. With respect to the relationship between the thickness of the splicing tape 3 and the height *h* of the step 7, the height of the step 7 can be made greater than the thickness of the other as previously discussed, but the upper limit thereof is indefinite. Better results may still be obtained if at least the height *h* of the step 7 is greater than the thickness of the splicing tape 3 by an amount equal to the thickness of the layer 4 of the coating liquid.

However, the extent mentioned above is not considered to be a limit and, even when the height *h* of the step 7 is greater than this extent, coating failure is not observed either. However, a limit apparently exists. For example, in the case of bead coating, the dimension of the gap between the coating nozzle and the coating roll must be such that the splice of the web can be passed therethrough easily. Therefore, such a limit is defined in connection with the coating device and is not a result per se of a limitation in the method of the invention.

Further, as is described hereinafter, where the coating speed is extremely high, coating failure sometimes occurs even at the leading edge of the splicing tape 3. Accordingly, it is difficult to set forth the limit unequivocably. From the above, it can be understood that the height *h* of the step 7 is principally determined depending on the coating device and should be determined, experimentally under actual processing conditions. Indeed, theoretically it is preferable that the height of the step 7 be equal to the height of the splicing tape 3 so that the thickness of the step is not determined strictly and a wide tolerance is permitted.

Figure 7:
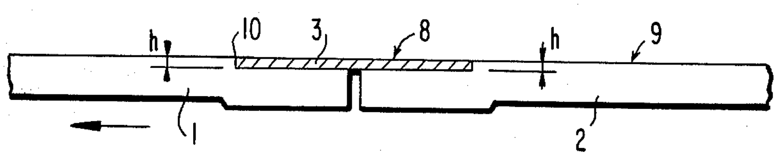
Figure 8:
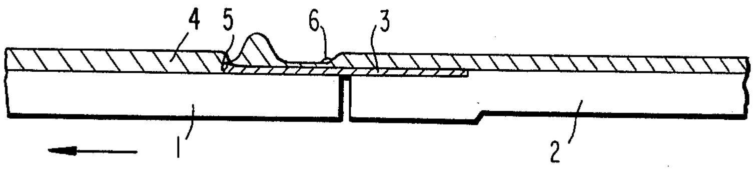
FIG. 8 is a schematic illustration of a splice in section in which a high speed coating is effected.

FIG. 7 illustrates another embodiment wherein the coating speed is extremely high. In layer formation in the vicinity of the connection where the coating speed is great, it is well known that unlike the case in FIG. 1 coating failure is produced also in front of the connection as shown in FIG. 8. Since it is apparent that such coating failure is attributed to the discontinuity of the web surface in the connection, it is assumed that the coating failure could be solved by removal of the discontinuity. FIG. 7 illustrates an arrangement wherein a step 10 is formed not only in the succeeding web portion 2 but also in the preceding web portion 1 so that the surface of the preceding web portion 1, the surface of the splicing tape 3 and the surface of the succeeding web portion 2 are all substantially the same height that is coplanar. If a web having the connection as hereinabove described is moved in the direction as indicated by the arrow into the coating station, it has been found no coating failure attributed to the discontinuity of web is produced.

Figure 9:
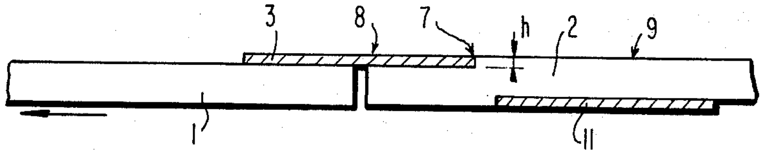

FIG. 9 illustrates a further embodiment of the present invention. The preceding web portion 1 and the succeeding web portion 2 are butt joined by a splicing tape 3 adhered on the surface to be coated, with a step 7 being formed in the succeeding web portion 2, and with the upper surface of the splicing tape 3 and the upper surface of the succeeding web portion 2 being made substantially coplanar. Further, following the step 7 a back tape 11 of substantially the same thickness as that of the splicing tape 3 is adhered on the surface opposite the surface to be coated. It has been often experienced that the height of the step of the web worked as shown in FIGS. 2, 4, 5, 6 and 7 is decreased when a strong external force is received before the web is coated. In general, since coating is carried out while the web is held by coating rolls, the height of the step can be accurately maintained as set during the time of coating if the back tape is provided as shown in FIG. 9, thus obtaining markedly improved results.

While the foregoing embodiments have been described only with respect to the case where a butt joint is employed, the invention can also be applied to those cases where other connecting methods such as a lap joint are employed. Moreover, the present invention can also be applied to those cases where discontinuous portions such as creases, or steps are present in the web surface to be coated.

The following examples are given to illustrate the present invention and its effects in greater detail.

EXAMPLE 1

Web portions of triacetyl cellulose having a width of 30 cm and a thickness of 180 microns were butt joined using an adhesive tape having a thickness of 50 microns, and a step of a height of 150 microns was formed in the succeeding web portion at a distance of 7 mm downstream from the trailing edge of the splicing tape. Then, the web portions thus joined were driven at a speed of 50 m/min, and an emulsion for X-ray photography having the properties as given in Table 1 below was applied thereto in a coating amount of 98 cc/m$^2$ using extrusion coating method. The coated layer after coating was examined, but no coating failure such as coating irregularities in the vicinity of the connection was found.

TABLE 1

| | | |
|---|---|---|
| Gelatin Cocentration | 5.0 | % |
| Viscosity | 30.0 | cp |
| Specific Gravity | 1.09 | |
| Surface Tension | 42.0 | dyne/cm |

EXAMPLE 2

Web portions of polyethylene terephthalate having a width of 30 cm and a thickness of 175 microns were butt joined using an adhesive tape having a thickness of 60 microns, and a step of a height of 130 microns was formed in the succeeding web portion at a distance of 5 mm downstream from the trailing edge of the splicing tape. Then, the web portions thus connected were driven at a speed of 70 m/min, and an emulsion for X-ray photography the same as that described in Example 1 was applied thereto in a coating amount of 80 cc/m$^2$ using extrusion coating method. The coated layer after coating was examined, but no coating failure such as coating irregularities in the vicinity of the splice were found.

In accordance with the present invention, the following advantages can be obtained.

1. In the coating of various types of coating liquids to a web having a discontinuous surface such as a connection of web portions produced by a splicing tape or the like, coating failure such as coating irregularities tending to be produced downstream of the discontinuity can be avoided to thereby provide a uniform and better coating.

2. Generation of bubbles tending to be produced downstream of the discontinuity attributed to the discontinuity in the web surface and adherence of the bubbles to the coating nozzle can be avoided so that better coating without any defects in the surface of the coating due to these bubbles, for example, the so-called streaks, can be achieved.

3. Coating failure tending to be produced downstream of the discontinuity attributed to the discontinuity in the web surface, particularly, a remarkably thick coating, can be avoided so that an extra drying which has been required in order to dry such a thickly coated portion can be omitted, or the drying ability can be considerably increased using the same drying device as heretofore employed.

4. Coating failure tending to be produced downstream of the discontinuity attributed to the discontinuity in the web surface, particularly remarkably thickly coating, can be avoided so that risks of equipment contamination produced due to the thickly coated and undried portion can be eliminated, and in addition, production does not have to be discontinued for the purpose of cleaning the equipment thereby considerably increasing production efficiency.

5. Coating failure tending to be produced downstream of the discontinuity attributed to the discontinuity in the web surface can be avoided with a simple device and in a convenient manner without the use of treating liquids whose handling is limiting. 6. Coating failure tending to be produced downstream of the discontinuity attributed to the discontinuity in the web surface is remarkably found particularly in high speed coating and is easily produced also upstream of the discontinuity in the high speed coating, which results in a limit to the coating speed thus hindering the accomplishment of high speed coating. Conversely, the present invention overcomes these disadvantages noted above and enables the requirements of high speed coating to be met.

While the invention has been described in detail and with reference to specific embodiments thereof, it will be apparent to one skilled in the art that various changes and modifications can be made therein without departing from the spirit and scope thereof.

What is claimed is:

1. A method of liquid coating a web having surface discontinuity on the side being liquid coated, said method including the steps of:

moving said web longitudinally through a coating station, applying said liquid to the face of said web bearing said discontinuity, the improvement comprising:

varying the thickness of the portion of the moving web immediately downstream of said surface discontinuity prior to movement of the web through said coating station to provide a height to said web portion facing said liquid coating which is not less than the height of said surface discontinuity, to prevent coating thickness irregularities by the presence of said discontinuity.

2. The method of claim 1, wherein the step of varying the thickness of said moving web portion immediately downstream of said surface discontinuity comprises rendering that portion of the web substantially coplanar with the surface discontinuity.

3. The method of claim 2, wherein said web comprises abutting web portions, said discontinuity comprises a splicing tape fixed to the surface of the web portions being coated and connecting the same and wherein the step of varying the thickness of said web portion immediately downstream of said surface discontinuity comprises reducing the thickness of that downstream web portion to which said splicing tape is mounted to the extent of the thickness of said splicing tape.

4. The method of claim 1, wherein said web comprises preceding and succeeding web portions relative to the direction of movement of said web through said coating station connected together by a splicing tape on the surface of the web being coated and the step of varying the thickness of the portion of said web immediately downstream of said surface discontinuity comprises reducing the thickness of the succeeding web portion carrying said splicing tape such that the surface of the succeeding web portion downstream of said tape is coplanar with the surface of the splicing tape being coated thereby and wherein said succeeding web portion is reduced in thickness along a length in excess of the extent of said splicing tape in contact therewith.

5. The method of claim 1, wherein said web comprises preceding and succeeding web portions in terms of the direction of web movement through the coating station connected by a splicing tape and wherein said succeeding web portion is reduced in thickness along the length thereof in contact with said splicing tape such that the portion of said succeeding web portion downstream of said tape has its surface being coated slightly higher than the surface of the splicing tape being similarly coated.

6. The method of claim 1, wherein said web comprises preceding and succeeding web portions in the direction of web movement through said coating station connected by a splicing tape and wherein the preceding web portion is separated from the succeeding web portion by a gap and said step of varying the thickness of the succeeding web portion downstream of said surface discontinuity comprises reducing the thickness of said succeeding web portion along a length which is in excess of the length of the splicing tape attached thereto and by an amount in excess of the thickness of said tape such that the surface of the succeeding web portion receiving said coating beyond said reduced thickness portion thereof has a height in excess of that of said splicing tape.

7. The method of claim 1, wherein said web comprises preceding and succeeding web portions relative to the direction of web movement through the coating station connected together by a splicing tape on the surface facing said liquid coating, and wherein the preceding and succeeding web portions are reduced in thickness to the extent of the thickness of the splicing tape being applied thereto such that the surfaces of said preceding and succeeding web portions beyond the reduced thickness portions thereof and the splicing tape carried by said reduced thickness portions of said preceding and succeeding web portions which face the applied coating are coplanar.

8. The method of claim 3, further comprising the step of applying a tape of substantially the same thickness as the splicing tape to the surface of the succeeding web portion opposite that being coated and immediately downstream of the trailing edge of the splicing tape relative to the direction of movement of said web through said coating station.

* * * * *